United States Patent [19]

Robertson

[11] Patent Number: 4,739,573
[45] Date of Patent: Apr. 26, 1988

[54] RELEASABLE FISH GAFF

[76] Inventor: Larry L. Robertson, 6812 Harlequin Way, Sacramento, Calif. 95842

[21] Appl. No.: 901,274

[22] Filed: Aug. 28, 1986

[51] Int. Cl.⁴ .............................................. A01K 97/14
[52] U.S. Cl. .................................................................. 43/5
[58] Field of Search .................... 43/5, 6; 294/19.3, 26

[56] References Cited

U.S. PATENT DOCUMENTS

| | | | |
|---|---|---|---|
| 2,570,538 | 10/1951 | Fincher | 294/26 |
| 2,586,245 | 2/1952 | McRae | 294/26 |
| 3,848,689 | 11/1974 | Hilterhaus | 294/26 |
| 3,863,377 | 2/1975 | Leonard | 294/19.3 |
| 3,991,502 | 11/1976 | Tudisco | 43/5 |

Primary Examiner—Gene P. Crosby
Attorney, Agent, or Firm—Gilden & Israel

[57] ABSTRACT

A fish gaff comprises a gaff hook releasably attached to a handle by either spring tension or compression. Depending upon the weight of the gaffed fish, the hook may be partially released from the handle to permit its relative rotation. This construction permits a user to maintain control of a fish without the gaff being twisted, bent or jerked out of the user's hands. In a first embodiment, spring tension is utilized to pull the hook into engagement with a locking slot formed in an interior portion of the handle. In a second embodiment, spring compression is utilized to maintain the hook in a locked position relative to the handle.

6 Claims, 2 Drawing Sheets

RELEASABLE FISH GAFF

BACKGROUND OF THE INVENTION

1. Field of the Invention

The present invention relates to fish gaffs, and more particularly pertains to a new and improved fish gaff construction wherein the gaff hook may be released to freely rotate relative to the associated handle when a substantially heavy fish is gaffed.

2. Description of the Prior Art

Fish gaffs are well known in the prior art, and numerous patents relating to their designs have been isused. Further, there are many commercially available and differently designed models of such gaffs and generally speaking, all of the commercially available devices essentially consist of a gaff hook having a handle rigidly attached thereto. These prior art fish gaffs are used by fishermen to land particularly heavy fish, i.e., once a heavy fish is brought alongside a boat or pier, a fisherman may utilize the gaff to snare the fish and remove it from the water.

Inasmuch as most of these prior art fish gaffs involve gaff hooks rigidly attached to their associated handles, fishermen have experienced serious problems in the use of such gaffs to land extremely heavy fish. As can be appreciated, a large fish can twist and turn quite violently in the water after being gaffed, which frequently results in the gaff having its hook bent or broken away from the handle while in many instances, a gaff can be jerked right out of the user's hands. As such, there is a continuing need for new and improved fish gaffs which can be easily utilized by a fisherman without any danger of the gaff being broken, distorted or jerked from his hands. The present invention substantially fulfills this need.

SUMMARY OF THE INVENTION

In view of the foregoing disadvantages inherent in the known types of fish gaffs now present in the prior art, the present invention provides an improved fish gaff assembly wherein the gaff hook can be partially released from its associated handle when a particularly large fish is gaffed, thereby permitting the hook to freely rotate within the handle to prevent distortion, breakage or the tearing of the gaff from the user's hands. As such, the general purpose of the present invention, which will be described subsequently in greater detail, is to provide a new and improved releasable fish gaff which has all of the advantages of the prior art fish gaffs and none of the disavantages.

To attain this, the present invention comprises a fish gaff assembly having a gaff hook spring-biasedly attached to its associated handle. More particularly, in a fist embodiment of the invention, the gaff hook is positioned within a hollow handle and is held in such position by a tensioned spring attached between the shaft of the hook and an end portion of the handle. The spring tension pulls a free end of the gaff hook into engagement with a receiving slot formed in an end member attached to the handle whereby rotation of the hook relative to the handle is prevented. With the gaff hook fixedly secured within the handle, a user of the gaff can operably control the positioning of the hook so as to gaff a fish in a desired location. When a user lifts a hooked fish of sufficient weight the tensioned spring is stretched so that the hook is pulled out of the locking slot within the handle, thereby to permit a free rotation of the hook relative to the handle.

In a second embodiment of the invention, the gaff includes a gaff hook having an end portion positioned within a hollow handle with such hook being lockably prevented from free rotation by a compression spring. More particularly, a spring is compressed between an end fitting on the hook and a topmost end member on the handle with the normal compression of the spring operating to hold the hook within a slot to prevent free rotation. In response to a sensed weight of a fish, the spring is further compressed whereby the hook is removed from the locking slot, thus permitting a free rotation of the hook during a landing of the fish.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing other structures, methods and systems for carrying out the several purposes of the present invention. It is important, therefore, that the claims be regarded as including such equivalent constructions so far as they do not depart from the spirit and scope of the present invention.

It is an object of the present invention to provide a new and improved releasable fish gaff which may be easily and efficiently manufactured and marketed.

It is a further object of the present invention to provide a new and improved releasable fish gaff which is of a durable and reliable construction and which is operable to prevent damage thereto when being utilized.

Still another object of the present invention is to provide a new and improved releasable fish gaff which is designed to permit a free rotation of a gaff hook relative to its handle when a particularly heavy fish is gaffed.

Yet another object of the present invention is to provide a new and improved releasable fish gaff which is characterized by a lightweight and sturdy construction, thereby to facilitate a using and transporting thereof.

An even further object of the present invention is to provide a new and improved releasable fish gaff which is susceptible of a low cost of manufacture with regard to both materials and labor, and which accordingly is then susceptible of low prices of sale to the consuming public, thereby making such fish gaffs economically available to the buying public.

Still yet another object of the present invention is to provide a new and improved releasable fish gaff which provides some of the advantages in the apparatuses and methods of the prior art while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
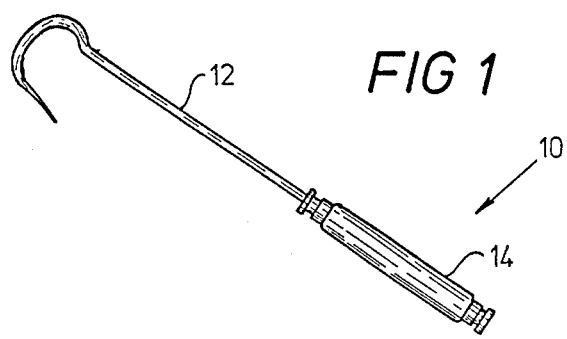
FIG. 1 is a perspective view of a first embodiment of the fish gaff forming the present invention.

With reference now to the drawings, and in particular to FIG. 1 thereof, a new and improved releasable fish gaff embodying the principles and concepts of the present invention and generally designated by the reference numeral 10 will be described. More particularly, it will be noted that the fish gaff 10 includes conventional elements such as a gaff hook 12 operably attached to an associated handle 14.

In a first embodiment of the invention, a modified form of the fish gaff 10 shown in FIG. 1 includes a tubular member 16 with the shank 18 forming a part of the gaff hook 12 being contained therein. Once positioned where desired, the member 16 is fixedly secured to the handle 14 by some conventional means, such as by welding, retaining pins, or the like.

Figure 2:
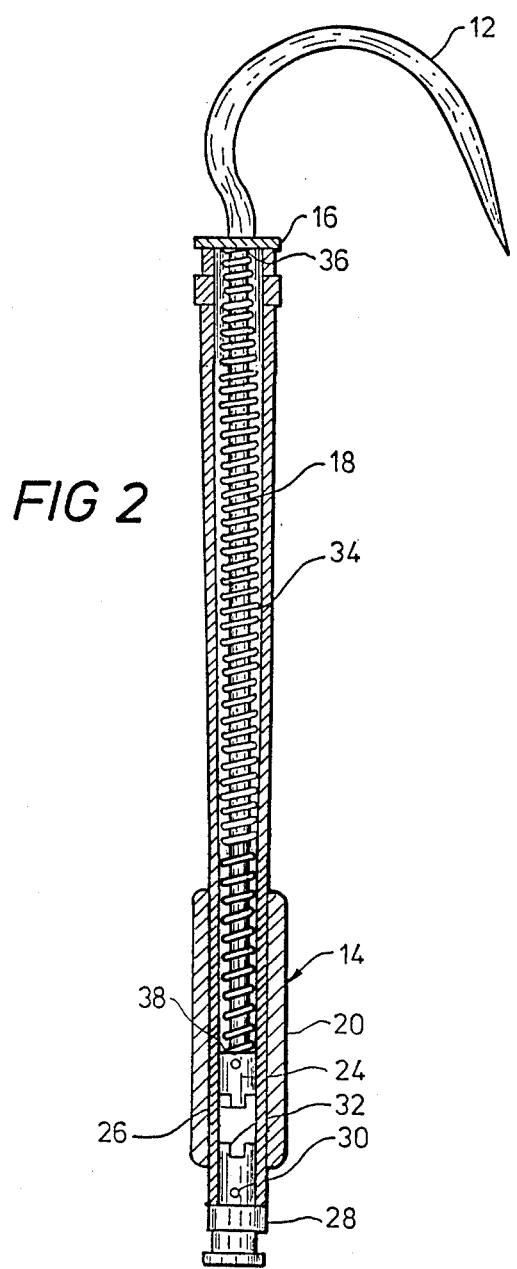
FIG. 2 is a cross-sectional elevation view of the first embodiment of the invention.
Figure 3:
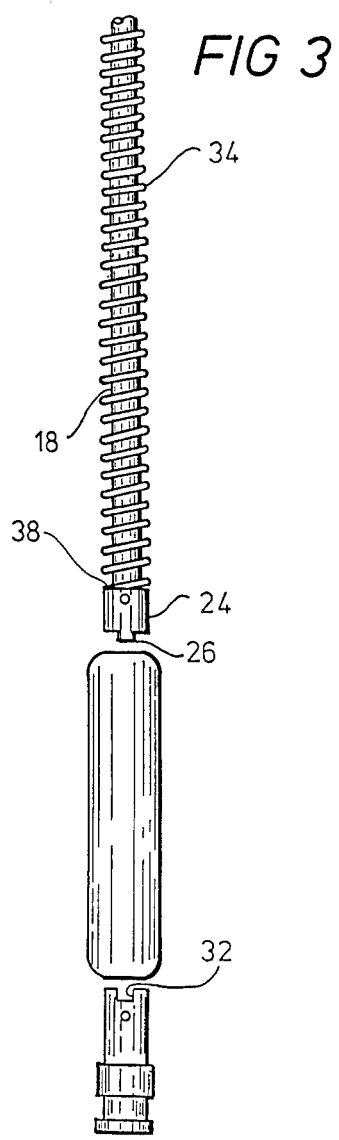
FIG. 3 is a partially exploded detail view of the first embodiment of the invention.

Referencing FIG. 3 in conjunction with FIG. 2, it will be understood that the shank 18 of gaff hook 12 is inserted through the hollow interior portion of the member 16. Typically, the handle 14 includes an exterior grip 20, which may be formed of a rubber-like material. The shank 18 may include an expanded diameter end member 24 which has an integral, downwardly extending pin or ridge 26. The diameter of the member 24 is such as to permit its slidable engagement with an interior wall portion of the member 16. The end member 24 may be fixedly secured to the shank 18 by any conventional attachment means, such as by welding, fastening pins, threaded attachment members, or the like.

An end fitting 28 is fixedly secured to a remaining free end of the member 16, with such end fitting extending upwardly within the interior portion of the member and being retained therein by some conventional means, such as through the use of a through-extending pin or threaded member 30. The end fitting 28 is provided with an integral slot 32 which is designed to receive the downwardly extending ridge 26 as above-described.

Positioned along an axial length of the shank 18 forming a part of the gaff hook 12 is a coil spring 34. In this embodiment of the invention, the coil spring 34 is freely positioned over the shank 18 and is maintained under compression so as to move the shank downwardly within the member 16, thereby to permit the ridge 26 to lockably engage the slot 32. To accomplish this desired compression of the spring 34, it can be appreciated that the remote ends 36, 38 of the spring must be in engagement with the end of the member 16 and the member 24. The positioning of the spring end 38 on shank 18 as illustrated in FIG. 3 is strictly for purposes of illustrating the manner of assembly of the fish gaff 10, and no further discussion therof is provided.

Figure 4:
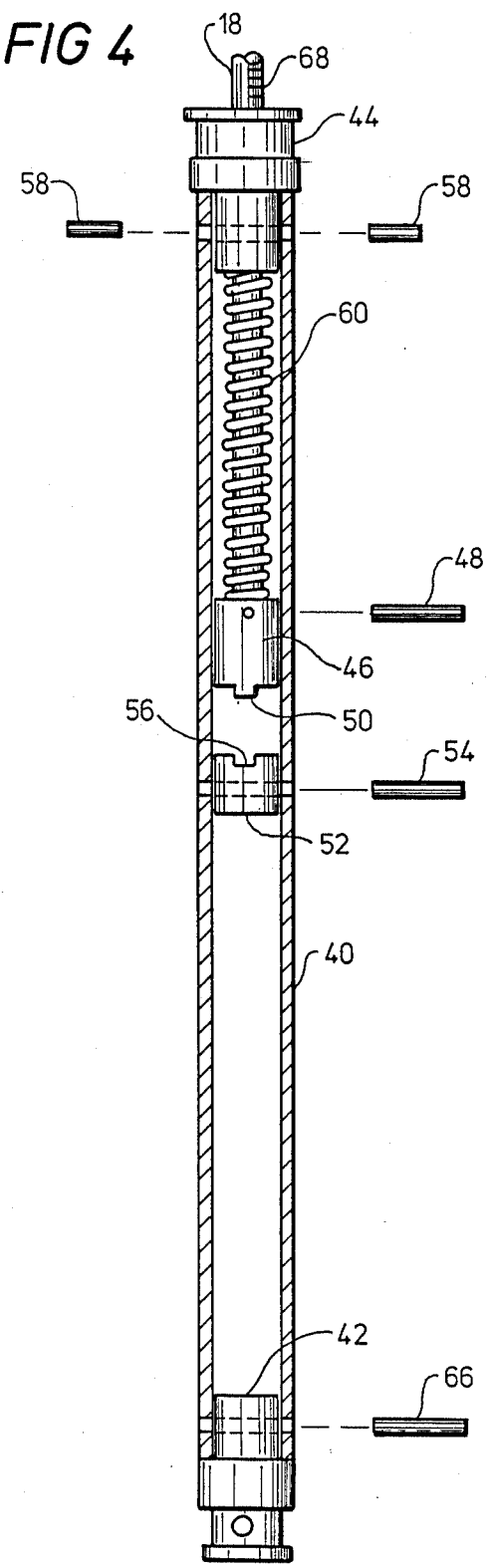
FIG. 4 is a cross-sectional detail view of a second embodiment of the invention.

FIG. 4 of the drawings illustrates a modified embodiment of the fish gaff 10 wherein the shank 18 of gaff hook 12 is slidably movable within a modified handle structure 40. In this respect, the modified handle 40 is also of a hollow tubular design and includes an end fitting 42 fixedly secured to a remote end thereof. The shank 18 extends through a second end fitting 44 which has a through-extending, axially aligned aperture for permitting slidable movement of the shank, while an end member 46 is then fixedly secured to a free end of the shank 18 by some conventional means, such as through the use of a locking pin 48 or the like. The end member 46 includes a downwardly extending pin or ridge 50 which is similar to the pin or ridge 26 as priorly described. A locking member 52 is positioned within an interior portion of the handle 40 at a desired location, and is retained in such location by some conventional fastening means, such as by the use of a further locking pin 54. Of course, the locking pin 54 is designed to be inserted through axially aligned apertures extending through the end member 52 and the associated handle or sleeve 40. The end member 52 is provided with a receiving slot 56 on a topmost portion thereof, with such slot being designed to receive the pin or ridge 50 so as to lockably prevent a free rotation of the shank 18 within the tubular handle 40.

With further reference to the end member 44, it will be observed that this member is also fixedly attached to the handle 40 by some conventional means, such as by the use of further locking pins 58 engagable with partially through-extending, aligned apertures. In this respect, pins 58 are engageable between the handle 40 and the end member 44, and do not extend completely the handle.

With continuing reference to FIG. 4, it will be observed that this embodiment of the invention utilizes a further compression spring 60 to effect an operable locking engagement of the ridge 50 with the locking slot 56. As with the first embodiment of the invention, the spring 60 need not have its free ends attached to any member, but rather can be coiled under compression about the shank 18 with its free ends abutting the end fitting 44 and the end member 46.

Figure 5:
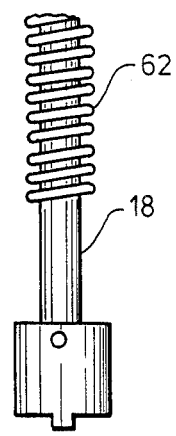
FIG. 5 is an exploded detail view of a modified form of the second embodiment of the invention.
Figure 5:
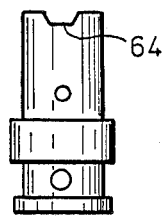

FIG. 5 of the drawings has been provided to further illustrate the versatility of design available to the present invention. More specifically, the modified embodiment of the invention illustrated in FIG. 5 shows a coiled spring 62 positioned about shank 18 of a gaff hook 12, with this embodiment envisioning the removal of the locking member 52 from an interior portion of the handle 40, and the end fitting 42 then being modified to include a locking slot 64 integrally formed on a topmost surface thereof. In this embodiment of the invention, which is essentially a modified form of the embodiment shown in FIG. 4, the end fitting 42 serves as the locking member and accordingly, it must be tightly retained within the handle 40. This fixed securement of the end fitting 42 within the handle 40 can be achieved by the use of some conventional attachment means, such as through the use of a further locking pin 66, or the like.

A further noteworthy feature of the invention is also illustrated in FIG. 5, wherein it will be appreciated that the locking slot 64 is provided with angulated or beveled side surfaces, thereby to facilitate the positioning and engagement of the locking pin or ridge 50 therewith. More specifically, if some wear or other damage occurs to the slot 64 over a period of time, the expanded width of the slot along a topmost portion thereof will compensate for such wear or damage, thereby to guarantee a continued useful operation of the fish gaff 10. An additional contemplated feature of the present invention includes the marking of the shank 18 in any of the invention embodiments, whereby such marking as illustrated by the number 68 in FIG. 4 correspondes to weight gradations of a scale. More specifically, the markings or notches 68 on the shank 18 can correspond to the weight of a fish and are calibrated to match the spring constant of the associated spring 60, i.e., depending upon the extent of movement of the shank 18 out of a particular fitting 44, a user of the fish gaff 10 can observe the markings 68 to determine the weight of the attached fish.

The manner of usage or operation of the present invention should now be readily apparent from the above description. However, a brief summary thereof will be provided. More specifically, it can be appreciated that a user of the fish gaff 10 will initially detect that the gaff hook 12 is rigidly retained within the handle 14 and member 16 by a compression spring 34, 60. With the gaff hook 12 being prevented from relative rotation with respect to the handle 14, a user thereof can appropriately position and set the hook in a large fish without undue difficulty. Once the fish has been gaffed, a user will begin to lift the fish out of the water at which time the gaff hook 12 will slidably move out of the member 16, 40. This outward movement of the hook 12 from the handle 14 results in the releasing of the spring-biased locking mechanism, thereby to permit the gaff hook to freely rotate within the handle 14 without becoming disattached therefrom. As such, a user can continue to lift the fish out of the water without any danger of the gaff hook 12 being bent or broken or of the entire fish gaff assembly being jerked out of the users hands.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A releasable fish gaff, comprising:
   a. gaff hook means, said gaff hook means including a hook portion and a shank portion, said shank portion including a locking ridge means;
   b. handle means having said gaff hook means operably attached thereto, said handle means having a hollow interior portion, said shank portion of said gaff hook means being slidably receivable within said hollow interior portion of said handle means, said handle means having further a locking member positioned therein, said locking member including a locking slot means, said locking slot means being engageable with said locking ridge means to prevent relative rotation between said gaff hook means and said handle means;
   c. spring means, for locking said ridge means in locking engagement with said locking slot means, and whereby said locking ridge means is releasable from said locking slot means in response to a predetermined weight.

2. The releasable fish gaff described in claim 1, wherein said spring means comprises a spring under load.

3. The releaseable fish gaff of claim 1, wherein said spring means comprises a spring under compression.

4. The releaseable fish gaff of claim 1, wherein said locking slot means includes a slot having angulated beveled side surfaces, whereby a topmost portion of said slot is of a greater width than a bottommost portion thereof.

5. The releaseable fish gaff of claim 4, wherein said locking ridge means includes a ridge member having a width of lesser dimension than the topmost portion of said slot.

6. The releaseable fish gaff of claim 1, and further including weight graduations along said shank portion, whereby an amount of weight being experienced by said gaff hook means can be determined by reference to said graduations.

* * * * *